US012425912B2

(12) United States Patent
Pauli et al.

(10) Patent No.: US 12,425,912 B2
(45) Date of Patent: Sep. 23, 2025

(54) CHANNEL STATE INFORMATION REPORTING FOR POINT-TO-MULTIPOINT OPERATION

(71) Applicant: Nokia Technologies Oy, Espoo (FI)

(72) Inventors: Volker Pauli, Munich (DE); David Bhatoolaul, Swindon (GB); David Navrátil, Espoo (FI); Naizheng Zheng, Beijing (CN); Ugur Baran Elmali, Munich (DE); Athul Prasad, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 379 days.

(21) Appl. No.: 18/249,456

(22) PCT Filed: Oct. 22, 2020

(86) PCT No.: PCT/CN2020/122996
§ 371 (c)(1),
(2) Date: Apr. 18, 2023

(87) PCT Pub. No.: WO2022/082669
PCT Pub. Date: Apr. 28, 2022

(65) Prior Publication Data
US 2023/0396356 A1 Dec. 7, 2023

(51) Int. Cl.
*H04L 1/00* (2006.01)
*H04L 1/1812* (2023.01)
(Continued)

(52) U.S. Cl.
CPC .......... *H04W 24/10* (2013.01); *H04L 1/0017* (2013.01); *H04L 1/0026* (2013.01);
(Continued)

(58) Field of Classification Search
CPC . H04L 1/0001–248; H04L 5/0001–26; H04W 4/06–10; H04W 8/22–245;
(Continued)

(56) References Cited

U.S. PATENT DOCUMENTS 8,139,534 B2    3/2012   Goto et al.
9,203,590 B2   12/2015   Ren et al.
(Continued)

FOREIGN PATENT DOCUMENTS

CN   110858793 A   3/2020
CN   110999120 A   4/2020
(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.
(Continued)

*Primary Examiner* — Timothy J Weidner
(74) *Attorney, Agent, or Firm* — Lippes Mathias LLP

(57) ABSTRACT

Embodiments of the present disclosure relate to methods, apparatuses and computer readable storage media for channel state information (CSI) reporting. According to embodiments of the present disclosure, a first device receives from a second device a configuration for CSI reporting. The configuration comprises at least a block error rate target and an indication of a number of HARQ transmissions. The first device determines Channel Quality Indicator (CQI) based on the block error rate target and the number of HARQ transmissions indicated by the configuration and transmits a CSI report comprising the CQI to the second device. The solution enables CSI feedback that is suitable for spectrally efficient and reliable delivery of Point to Multipoint services
(Continued)

while meeting the delay requirement, in particular in the context of NACK-only feedback on common feedback resources.

20 Claims, 3 Drawing Sheets

(51) Int. Cl.
| | |
|---|---|
| *H04L 1/1867* | (2023.01) |
| *H04L 5/00* | (2006.01) |
| *H04W 4/06* | (2009.01) |
| *H04W 24/10* | (2009.01) |
| *H04W 28/04* | (2009.01) |
| *H04W 72/231* | (2023.01) |
| *H04W 84/02* | (2009.01) |
| *H04W 88/02* | (2009.01) |
| *H04W 88/08* | (2009.01) |
| *H04W 92/10* | (2009.01) |

(52) U.S. Cl.
CPC ............ *H04L 1/1812* (2013.01); *H04L 1/189* (2013.01); *H04L 5/0057* (2013.01); *H04L 5/006* (2013.01); *H04W 4/06* (2013.01); *H04W 28/04* (2013.01); *H04W 72/231* (2023.01); *H04L 2001/0093* (2013.01); *H04W 84/02* (2013.01); *H04W 88/02* (2013.01); *H04W 88/08* (2013.01); *H04W 92/10* (2013.01)

(58) Field of Classification Search
CPC ..... H04W 24/02–10; H04W 28/02–26; H04W 72/02–569; H04W 84/02–16; H04W 88/02–12; H04W 92/02–04; H04W 92/10
See application file for complete search history.

(56) References Cited

U.S. PATENT DOCUMENTS

| | | |
|---|---|---|
| 2013/0182789 A1 | 7/2013 | Ko et al. |
| 2017/0353273 A1 | 12/2017 | Zhang et al. |
| 2019/0052397 A1 | 2/2019 | Onggosanusi et al. |
| 2019/0312684 A1 | 10/2019 | Christoffersson et al. |
| 2020/0059812 A1 | 2/2020 | Lyu et al. |
| 2020/0178274 A1 | 6/2020 | Shi et al. |
| 2020/0275413 A1 | 8/2020 | Zhang et al. |

FOREIGN PATENT DOCUMENTS

| | | |
|---|---|---|
| CN | 111418175 A | 7/2020 |
| WO | 2019/192332 A1 | 10/2019 |

OTHER PUBLICATIONS

"New Work Item on NR support of Multicast and Broadcast Services", 3GPP TSG RAN Meeting #86, RP-193248, Agenda: 9.1.2, Huawei, Dec. 9-12, 2019, 5 pages.

"3rd Generation Partnership Project; Technical Specification Group Radio Access Network; Evolved Universal Terrestrial Radio Access (E-UTRA); Study on single-cell point-to-multipoint transmission for E-UTRA (Release 13)", 3GPP TR 36.890, V13.0.0, Jun. 2015, pp. 1-31.

"3rd Generation Partnership Project; Technical Specification Group Radio Access Network; NR; Physical layer procedures for data (Release 16)", 3GPP TS 38.214, V16.2.0, Jun. 2020, pp. 1-163.

"5G; NR; Multiplexing and channel coding (3GPP Ts 38.212 version 16.3.0 Release 16)", ETSI TS 138 212, V16.3.0, Nov. 2020, 155 pages.

Cai et al., "Reduced Feedback Schemes for LTE MBMS", IEEE 69th Vehicular Technology Conference, Apr. 26-29, 2009, pp. 1-5.

"IEEE 802.11", Wikipedia, Retrieved on May 16, 2023, Webpage available at : https://en.wikipedia.org/wiki/IEEE_802.11.

International Search Report and Written Opinion received for corresponding Patent Cooperation Treaty Application No. PCT/CN2020/122996, dated Jul. 14, 2021, 10 pages.

"Reliability Improvements for RRC_CONNECTED UEs", 3GPP TSG RAN WG1 Meeting #103-e, R1-2008883, Agenda: 8.12.2, Nokia, Oct. 26-Nov. 13, 2020, 14 pages.

Extended European Search Report received for corresponding European Patent Application No. 20958251.9, dated Jun. 6, 2024, 11 pages.

CHANNEL STATE INFORMATION REPORTING FOR POINT-TO-MULTIPOINT OPERATION

RELATED APPLICATION

This application was originally filed as PCT Application No. PCT/CN2020/122996, filed on Oct. 22, 2020, which is incorporated herein by reference in its entirety.

TECHNICAL FIELD

Embodiments of the present disclosure generally relate to the field of telecommunications, and in particular, to methods, apparatuses and computer readable media for channel state information (CSI) reporting.

BACKGROUND

In Release 17 (Rel-17) of 3GPP specifications, a work item for support of multicast and broadcast systems (MBS) is approved. In this work item, Point to Multipoint (PTM) transmission is expected to efficiently provision MBS services to multiple users by using the same radio framework as unicast transmission. A primary focus is on strategies to achieve high efficiency and reliability to enable new use cases for PTM. The application of Hybrid Automatic Repeat Request (HARQ) techniques and various options are being investigated.

SUMMARY

In general, example embodiments of the present disclosure provide methods, apparatuses and computer readable media for CSI reporting.

In a first aspect, there is provided a method. The method comprises receiving, at a first device and from a second device, a configuration for channel state information reporting, the configuration comprising at least a block error rate target and an indication of a number of HARQ transmissions; determining Channel Quality Indicator based on the block error rate target and the number of HARQ transmissions indicated by the configuration; and transmitting a channel state information report comprising the Channel Quality Indicator to the second device.

In a second aspect, there is provided a method. The method comprises transmitting, from a second device to a first device, a configuration for channel state information reporting, the configuration comprising at least a block error rate target and an indication of a number of HARQ transmissions; and receiving a channel state information report comprising Channel Quality Indicator from the first device, the Channel Quality Indicator being determined based on the block error rate target and the number of HARQ transmissions indicated by the configuration.

In a third aspect, there is provided a first device. The first device comprises at least one processor and at least one memory including computer program codes. The at least one memory and the computer program codes are configured to, with the at least one processor, cause the first device to receive, from a second device, a configuration for channel state information reporting, the configuration comprising at least a block error rate target and an indication of a number of HARQ transmissions; determine Channel Quality Indicator based on the block error rate target and the number of HARQ transmissions indicated by the configuration; and transmit a channel state information report comprising the Channel Quality Indicator to the second device.

In a fourth aspect, there is provided a second device. The second device comprises at least one processor and at least one memory including computer program codes. The at least one memory and the computer program codes are configured to, with the at least one processor, cause the second device to transmit, to a first device, a configuration for channel state information reporting, the configuration comprising at least a block error rate target and an indication of a number of HARQ transmissions; and receive a channel state information report comprising Channel Quality Indicator from the first device, the Channel Quality Indicator being determined based on the block error rate target and the number of HARQ transmissions indicated by the configuration.

In a fifth aspect, there is provided an apparatus. The apparatus comprises means for receiving, from a further apparatus, a configuration for channel state information reporting, the configuration comprising at least a block error rate target and an indication of a number of HARQ transmissions; means for determining Channel Quality Indicator based on the block error rate target and the number of HARQ transmissions indicated by the configuration; and means for transmitting a channel state information report comprising the Channel Quality Indicator to the further apparatus.

In a sixth aspect, there is provided an apparatus. The apparatus comprises means for transmitting, to a further apparatus, a configuration for channel state information reporting, the configuration comprising at least a block error rate target and an indication of a number of HARQ transmissions; and means for receiving a channel state information report comprising Channel Quality Indicator from the further apparatus, the Channel Quality Indicator being determined based on the block error rate target and the number of HARQ transmissions indicated by the configuration.

In a seventh aspect, there is provided a computer program product that is stored on a computer readable medium and includes machine-executable instructions. The machine-executable instructions, when being executed, cause a machine to perform the method according to the above first or second aspect.

In an eighth aspect, there is a computer readable storage medium comprising program instructions stored thereon. The instructions, when executed by an apparatus, cause the apparatus to perform the method according to the above first or second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
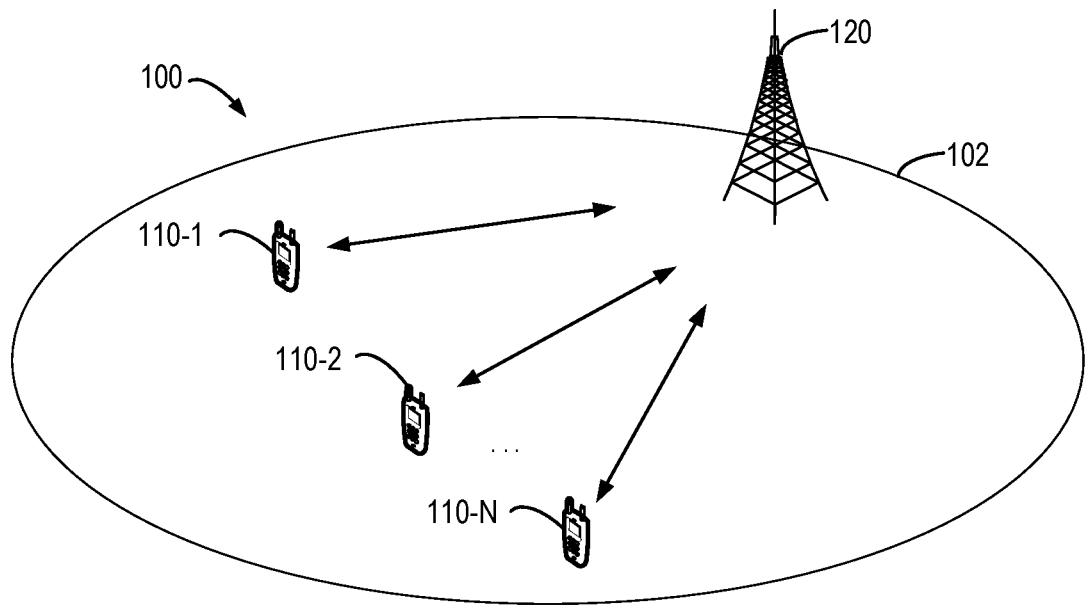
FIG. 1 shows an example communication network in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology. In the following description, the terms "network device", "BS", and "node" may be used interchangeably.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

In wireless technologies, retransmission-based error recovery techniques are widely exploited to ensure the reliable transmission of data despite it being received with errors. Typically, Automatic Repeat reQuest (ARQ), which is implemented for Radio Link Control (RLC) acknowledged mode, and Hybrid Automatic Repeat reQuest (HARQ), which is implemented in the Media Access Control (MAC)/Physical (PHY) layer, are used to tailor the retransmission of data for improving the reliability of radio links. These methods can greatly improve the spectral efficiency of communication over radio fading channels.

For MBS, 3GPP has studied (TR 36.890) the potential use of HARQ for improving the reliability of PTM radio transmissions, but so far, they have only been deployed in point to point (PTP) service delivery. The result of that study shows that HARQ can improve transmissions in the presence of errors. However, when there is a large number of UEs consuming the MBS service, there may be many HARQ ACK/NACK feedback messages, resulting in high signaling overhead and resource inefficiency. Typically, the so called "enhanced Outer Loop Link Adaptation (eOLLA)" technique, which adjusts the Modulation and Coding Scheme (MCS) to an increasingly conservative setting based on the worst positioned UE, was used as an alternative technique to attain the required reliability level. However, for the same number of UEs (where the eOLLA does not react), there might be bursty errors that randomly occur over time (due to fading and power degradations), leading to loss of data units. As such, maintaining a reasonably efficient MCS along with data retransmission via HARQ (for lost/decode-fail data units) is crucial to improve the reliability of the link. Simulation results also indicate that in the presence of relatively large audiences, the use of a slowly changing MCS while relying on adaptive retransmissions via HARQ to take care of fast fading variations allows for much higher spectral efficiency than schemes like eOLLA that control reliability without HARQ.

One approach for addressing the problem of HARQ feedback overhead is NACK-only based HARQ feedback. That is, the network device provides a common uplink radio resource (e.g. Physical Uplink Control Channel (PUCCH) or Physical Random Access Channel (PRACH)) that may be used for NACK transmission by any UE that was unable to decode the associated PDSCH. This approach can avoid the scaling of the uplink overhead with a growing number of UEs. The network device can just use energy detection to understand if any UE has requested a retransmission for a particular packet. However, it is not possible for the network device to understand the error rate of the individual UEs from this feedback on a common resource. Hence, additional feedback on the channel or service delivery quality needs to be provided by the UEs in order to facilitate efficient link adaptation for the PTM transmissions.

A typical Adaptive Modulation and Coding (AMC) process uses Channel Quality Indicator (CQI) feedback and HARQ ACK/NACK feedback to select an appropriate Modulation and Coding Scheme (MCS) to meet the reliability target in terms of residual block error rate (BLER). The NACK-only HARQ does not allow the network device to estimate a residual BLER (i.e., the BLER after retransmissions), because a UE measures and reports CQI after an initial HARQ transmission. This means that the network device cannot determine the residual BLER from CQI measured for the initial HARQ transmission and the NACK-only HARQ feedback sent on a shared resource. Consequently, a new method for CQI measurement used in conjunction with NACK-only HARQ feedback is needed. Also, the definition of the CQI used for PTM can be more tailored to the purpose in order to make the CQI feedback more efficient.

Another important aspect in delivery of a service over a network is the Quality of Service (QoS) characteristics applicable to each service. For some services, such as in the context of autonomous vehicles, high reliability at very low latency may be crucial. Other services, such as multi-media streaming, do not have as stringent delay requirements and possibly even have application layer forward error correction allowing for some residual errors at RAN level. The spectral efficiency of the PTM service delivery greatly depends on the configuration of the reliability target and tolerable delay. Therefore, it is desired to extend the configuration of CSI reports for PTM, such that UEs provide the kind of CSI feedback that is suitable for spectrally efficient and reliable delivery of Point to Multipoint services, in particular in the context of NACK-only feedback on common feedback resources.

Embodiments of the present disclosure propose a solution for CSI reporting, so as to solve the above problems and one or more of other potential problems. In this solution, the network device indicates to a UE not only a BLER target to use in CQI reporting, but also a number of HARQ (re-) transmissions for a transport block based on which the BLER underlying the CQI report should be measured. In this way, the solution enables CSI feedback that is suitable for spectrally efficient and reliable delivery of Point to Multipoint services while meeting the delay requirement, in particular in the context of NACK-only feedback on common feedback resources.

Principle and implementations of the present disclosure will be described in detail below with reference to FIGS. 1-6.

FIG. 1 shows an example communication network 100 in which implementations of the present disclosure can be implemented. The communication network 100 includes a network device 120 and terminal devices 110-1, 110-2 . . . and 110-N, which can be collectively referred to as "terminal device(s)" 110. The network 100 can provide one or more cells 102 to serve the terminal devices 110. It is to be understood that the number of network devices, terminal devices and/or cells is given for the purpose of illustration without suggesting any limitations to the present disclosure. The communication network 100 may include any suitable number of network devices, terminal devices and/or cells adapted for implementing implementations of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
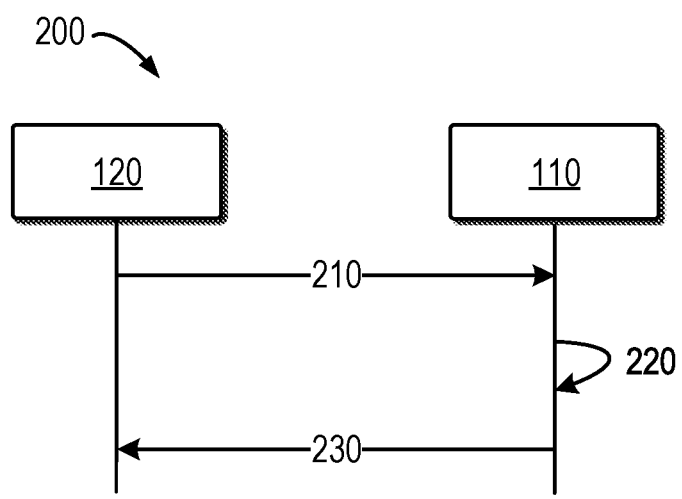
FIG. 2 illustrates a schematic diagram of interactions between devices according to some example embodiments of the present disclosure.

FIG. 2 illustrates a schematic diagram of interactions 200 between devices according to some example embodiments of the present disclosure. For example, the interactions 200 involve the terminal device 110 and the network device 120 shown in FIG. 1.

As shown in FIG. 2, the network device 120 transmits 210, to the terminal device 110, a configuration for CSI reporting.

In some example embodiments, the configuration comprises at least a BLER target and an indication of a number of HARQ transmissions (represented as "$N_{HARQ,\ CQI}$" in the following) for a transport block. Alternatively, the configuration may comprise no such indication.

In some example embodiments, the configuration may be transmitted via RRC signaling.

As shown in FIG. 2, the terminal device 110 determines 220 CQI based on the BLER target and the number of HARQ transmissions indicated by the configuration and transmits 230 a CSI report comprising the CQI to the network device 120.

In some example embodiments, if the configuration comprises no indication of the number of HARQ transmissions $N_{HARQ,\ CQI}$, the terminal device 110 may perform the CQI determination as legacy solutions. For example, the terminal device 110 may determine the CQI based on the BLER target after reception of an initial HARQ transmission for a transport block.

In some example embodiments, if the configuration comprises the indication of the number of HARQ transmissions $N_{HARQ,\ CQI}$ and $N_{HARQ,\ CQI}=1$, the terminal device 110 may perform the CQI determination as legacy solutions. For example, the terminal device 110 may determine the CQI based on the BLER target after reception of an initial HARQ transmission for a transport block or determine the CQI based on the BLER target by assuming reception of a single HARQ transmission. For example, in a scenario where a PTM service cannot tolerate any delay due to HARQ retransmissions, the network device 120 may transmit the configuration indicating $N_{HARQ,\ CQI}=1$ to the terminal device 110, with the target BLER set to the residual BLER target of the PTM service.

In some example embodiments, if the configuration comprises the indication of the number of HARQ transmissions $N_{HARQ,\ CQI}$ and $N_{HARQ,\ CQI}>1$, the terminal device 110 may determine the CQI based on the BLER target after reception of $N_{HARQ,\ CQI}$ HARQ transmissions for a transport block. Alternatively, if the configuration comprises the indication of the number of HARQ transmissions $N_{HARQ,\ CQI}$ and $N_{HARQ,\ CQI}>1$, the terminal device 110 may determine the CQI based on the BLER target by assuming reception of $N_{HARQ,\ CQI}$ HARQ transmissions without actually receiving the $N_{HARQ,\ CQI}$ HARQ transmissions. For example, in a scenario where a PTM service has a delay budget not conflicting with the maximum number $N_{HARQ,\ MAX}$ of HARQ (re-)transmissions that the network device 120 would allow, the network device 120 may transmit the configuration indicating $N_{HARQ,\ CQI}=N_{HARQ,\ MAX}$ to the terminal device 110.

In some example embodiments, if the terminal device 110 receives a HARQ transmission for a transport block, the terminal device 110 may determine an index of the HARQ transmission and thus determine the total number of HARQ transmissions for the transport block received from the network device 120. In response to the determined total number equaling to $N_{HARQ,\ CQI}$, the terminal device 110 may determine the CQI by measuring a time-averaged BLER in accordance with the BLER target. In response to the determined total number being below $N_{HARQ,\ CQI}$ but the transport block being decoded successfully, the terminal device 110 may determine the CQI by measuring a time-averaged BLER in accordance with the BLER target even if the $N_{HARQ,\ CQI}$ HARQ transmissions are not actually received by the terminal device 110.

It is to be understood that the way in which the terminal device 110 performs the CQI determination and/or reporting can be similar as the legacy solutions, which will not be further described in detail herein. It is to be noted that, if the target BLER is extremely low (for example, below 0.1%), the terminal device 110 may resort to measurement of the post-decoding Signal to Interference plus Noise Ratio (SINR) distribution or evaluation of not only the success/failure of decoding but also the decoding probability per received transport block, so as to determine the CQI.

In some example embodiments, the CSI report for use in the context of PTM may be different from that for use in unicast communications. Traditionally, the CSI report may include CQI, Rank Indicator (RI) as well as Channel State Information-Reference Signal Indicator (CRI) based on which the CSI measurements are done there. In the PTM scenario, a CSI-RS port can be reserved for PTM measurements, but the CQI measurement should anyway rather be based on actual (time-averaged) BLER rather than (instantaneous) channel measurements. In this case, the CSI report may comprise no CRI.

Alternatively, or in addition, in some example embodiments, in case that spatial multiplexing for PTM is not supported by the system or not configured for a particular service, the CSI report may comprise no RI. Furthermore, in some example embodiments, since fast fading is not to be tracked by the CSI report, only wideband (WB) CQI (limited to the bandwidth part (BWP) on which the PTM service is delivered) is required. The BWP in which to do the measurement may be indicated to the terminal device in the measurement configuration, and thus there is no need to indicate this in the CSI report.

Based on the fact that various simultaneously delivered PTM services might have different QoS requirements, the configuration of $N_{HARQ, CQI}$ may be service specific, for example, bound to the service-specific Group-Radio Network Temporary Identifier (G-RNTI). In this case, an identifier of the PTM service needs to be present (e.g., in place of the saved CRI field), unless it is implicitly clear (e.g., from the resources used to send the CSI report that relates to the PTM service itself). This identifier may not need to be the full G-RNTI, but may be a small field whose size depends on the number of concurrent PTM services that the system supports. For example, this identifier may also be defined as a certain subset of the bits of the G-RNTI. In some example embodiments, if this identifier is used, the configuration for CSI reporting transmitted via RRC signaling may also comprise this identifier for mapping the CSI report and its respective configuration to the service associated with this identifier.

It can be seen from the above that, in some example embodiments, the CSI report may comprise only wideband CQI (WB-CQI). Alternatively, in some example embodiments, the CSI report may comprise both WB-CQI and RI. Alternatively, in some example embodiments, the CSI report may comprise both WB-CQI and an identifier of the PTM service. Alternatively, in some example embodiments, the CSI report may comprise WB-CQI, RI and an identifier of the PTM service.

In some example embodiments, prior to the transmission of the CSI report, the network device 120 may transmit a dedicated request for the CSI report to the terminal device 110. In response to receiving the request, the terminal device 110 may transmit the CSI report to the network device 120. Alternatively, in some example embodiments, the dedicated request can be omitted, as shown in FIG. 2.

Figure 3:
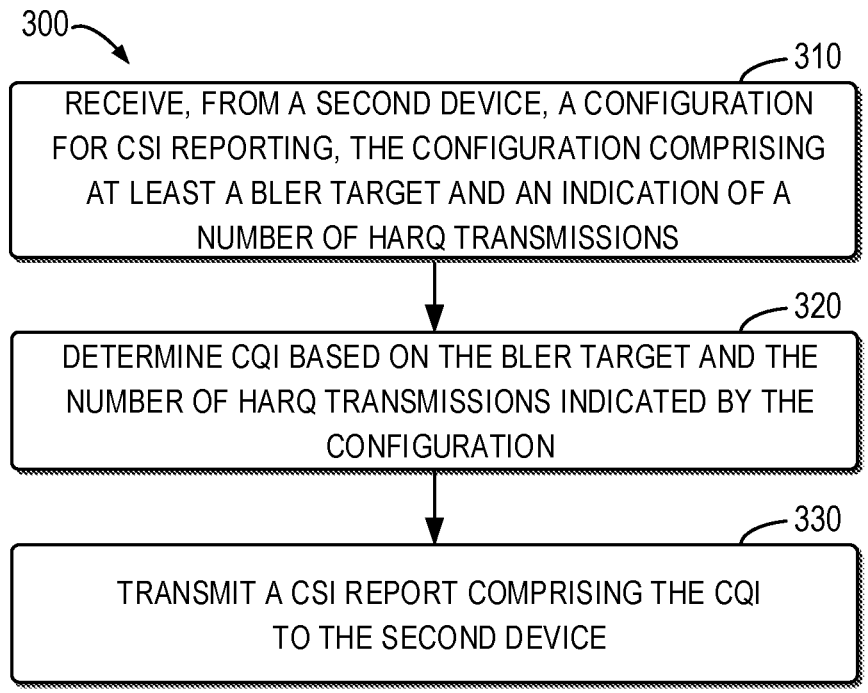
FIG. 3 illustrates a flowchart of an example method according to some example embodiments of the present disclosure.

FIG. 3 shows a flowchart of an example method 300 in accordance with some example embodiments of the present disclosure. The method 300 can be implemented at the terminal device 110 shown in FIG. 1 and/or FIG. 2. In the following, the terminal device 110 is also referred to as a "first device" and the network device 120 is also referred to as a "second device". It is to be understood that the method 300 may include additional blocks not shown and/or may omit some shown blocks, and the scope of the present disclosure is not limited in this regard.

At block 310, the first device receives, from a second device, a configuration for CSI reporting, the configuration comprising at least a BLER target and an indication of a number of HARQ transmissions.

In some example embodiments, the first device may receive the configuration from the second device via RRC signaling.

At block 320, the first device determines CQI based on the BLER target and the number of HARQ transmissions indicated by the configuration.

In some example embodiments, in accordance with a determination that the number of HARQ transmissions indicated by the configuration equals to a predetermined threshold, the first device may determine the CQI based on the BLER target after reception of an initial HARQ transmission for a transport block.

In some example embodiments, in accordance with a determination that the number of HARQ transmissions indicated by the configuration exceeds the predetermined threshold, the first device may determine the CQI based on the BLER target after reception of the number of HARQ transmissions for a transport block.

In some example embodiments, in accordance with a determination that the number of HARQ transmissions indicated by the configuration exceeds the predetermined threshold, the first device may determine the CQI based on the BLER target after reception of a part of the number of HARQ transmissions for a transport block.

In some example embodiments, the predetermine threshold may equal to 1.

At block 330, the first device transmits a CSI report comprising the CQI to the second device.

In some example embodiments, the CSI report may be transmitted in response to receiving a request for the channel state information report from the second device.

In some example embodiments, the CSI report may further comprise RI.

In some example embodiments, the CSI report may further comprise an identifier of a service associated with the CSI report.

In some example embodiments, the configuration may further comprise the identifier of the service associated with the CSI report.

In some example embodiments, the identifier of the service associated with the channel state information report may be determined based on G-RNTI associated with the service.

In some example embodiments, the first device may be a terminal device and the second device may be a network device serving the terminal device.

Figure 4:
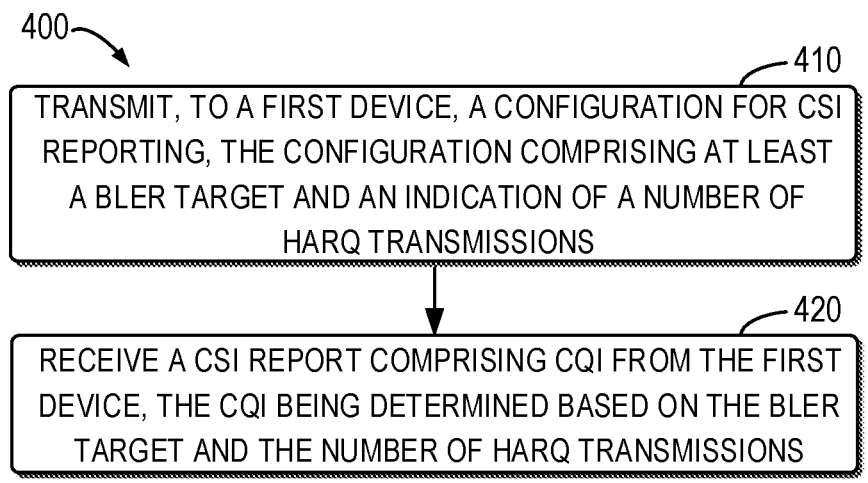
FIG. 4 illustrates a flowchart of an example method according to some example embodiments of the present disclosure.

FIG. 4 shows a flowchart of an example method 400 in accordance with some example embodiments of the present disclosure. The method 400 can be implemented at the network device 120 shown in FIG. 1 and/or FIG. 2. In the following, the terminal device 110 is also referred to as a "first device" and the network device 120 is also referred to as a "second device". It is to be understood that the method 400 may include additional blocks not shown and/or may omit some shown blocks, and the scope of the present disclosure is not limited in this regard.

At block 410, the second device transmits, to a first device, a configuration for CSI reporting, the configuration comprising at least a BLER target and an indication of a number of HARQ transmissions.

In some example embodiments, the second device may transmit the configuration to the first device via RRC signaling.

At block 420, the second device receives a CSI report comprising CQI from the first device, the CQI being determined based on the BLER target and the number of HARQ transmissions indicated by the configuration.

In some example embodiments, the second device may transmit a request for the CSI report to the first device prior to receiving the CSI report.

In some example embodiments, the CSI report may further comprise RI.

In some example embodiments, the CSI report may further comprise an identifier of a service associated with the CSI report.

In some example embodiments, the configuration may further comprise the identifier of the service associated with the CSI report.

In some example embodiments, the identifier of the service associated with the CSI report is determined based on G-RNTI associated with the service.

In some example embodiments, the first device may be a terminal device and the second device may be a network device serving the terminal device.

In some example embodiments, an apparatus capable of performing the method 300 may comprise means for performing the respective steps of the method 300. The means may be implemented in any suitable form. For example, the means may be implemented in a circuitry or software module.

In some example embodiments, the apparatus capable of performing the method 300 (for example, the terminal device 110) comprises: means for receiving, from a further apparatus, a configuration for channel state information reporting, the configuration comprising at least a block error rate target and an indication of a number of HARQ transmissions; means for determining Channel Quality Indicator based on the block error rate target and the number of HARQ transmissions indicated by the configuration; and means for transmitting a channel state information report comprising the Channel Quality Indicator to the further apparatus.

In some example embodiments, the means for receiving the configuration comprises: means for receiving the configuration from the further apparatus via Radio Resource Control signaling.

In some example embodiments, the means for determining the Channel Quality Indicator comprises: means for in accordance with a determination that the number of HARQ transmissions indicated by the configuration equals to a predetermined threshold, determining the Channel Quality Indicator based on the block error rate target after reception of an initial HARQ transmission for a transport block.

In some example embodiments, the means for determining the Channel Quality Indicator comprises: means for in accordance with a determination that the number of HARQ transmissions indicated by the configuration exceeds the predetermined threshold, determining the Channel Quality Indicator based on the block error rate target after reception of the number of HARQ transmissions for a transport block.

In some example embodiments, the means for determining the Channel Quality Indicator comprises: means for in accordance with a determination that the number of HARQ transmissions indicated by the configuration exceeds the predetermined threshold, determining the Channel Quality Indicator based on the block error rate target after reception of a part of the number of HARQ transmissions for a transport block.

In some example embodiments, the predetermined threshold equals to 1.

In some example embodiments, the means for transmitting the channel state information report comprises: means for in response to receiving a request for the channel state information report from the further apparatus, transmitting the channel state information report to the further apparatus.

In some example embodiments, the channel state information report further comprises Rank Indicator.

In some example embodiments, the channel state information report further comprises an identifier of a service associated with the channel state information report.

In some example embodiments, the configuration further comprises the identifier of the service associated with the channel state information report.

In some example embodiments, the identifier of the service associated with the channel state information report is determined based on Group-Radio Network Temporary Identifier associated with the service.

In some example embodiments, the apparatus is a terminal device and the further apparatus is a network device serving the terminal device.

In some example embodiments, an apparatus capable of performing the method 400 may comprise means for performing the respective steps of the method 400. The means may be implemented in any suitable form. For example, the means may be implemented in a circuitry or software module.

In some example embodiments, the apparatus capable of performing the method 400 (for example, the network device 120) comprises: means for transmitting, to a further apparatus, a configuration for channel state information reporting, the configuration comprising at least a block error rate target and an indication of a number of HARQ transmissions; and means for receiving a channel state information report comprising Channel Quality Indicator from the further apparatus, the Channel Quality Indicator being determined based on the block error rate target and the number of HARQ transmissions indicated by the configuration.

In some example embodiments, the means for transmitting the configuration comprises: means for transmitting the configuration to the further apparatus via Radio Resource Control signaling.

In some example embodiments, the apparatus capable of performing the method 400 further comprises: means for transmitting a request for the channel state information report to the further apparatus.

In some example embodiments, the channel state information report further comprises Rank Indicator.

In some example embodiments, the channel state information report further comprises an identifier of a service associated with the channel state information report.

In some example embodiments, the configuration further comprises the identifier of the service associated with the channel state information report.

In some example embodiments, the identifier of the service associated with the channel state information report is determined based on Group-Radio Network Temporary Identifier associated with the service.

In some example embodiments, the further apparatus is a terminal device and the apparatus is a network device serving the terminal device.

Figure 5:
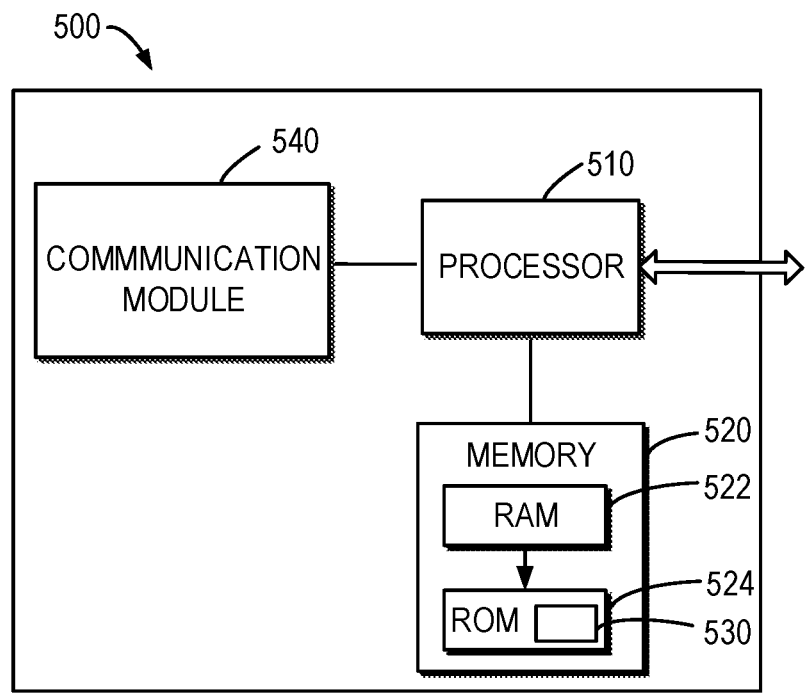
FIG. 5 illustrates a simplified block diagram of an apparatus that is suitable for implementing embodiments of the present disclosure.

FIG. 5 is a simplified block diagram of a device 500 that is suitable for implementing embodiments of the present disclosure. For example, the network device 120 and/or the terminal device 110 can be implemented by the device 500. As shown, the device 500 includes one or more processors 510, one or more memories 520 coupled to the processor 510, and one or more communication modules 540 coupled to the processor 510.

The communication module 540 is for bidirectional communications. The communication module 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 524. The processor 510 may perform any suitable actions and processing by loading the program 530 into the RAM 522.

The embodiments of the present disclosure may be implemented by means of the program 530 so that the device 500 may perform any process of the disclosure as discussed with reference to FIGS. 2-4. The embodiments of the present disclosure may also be implemented by hardware or by a combination of software and hardware.

Figure 6:
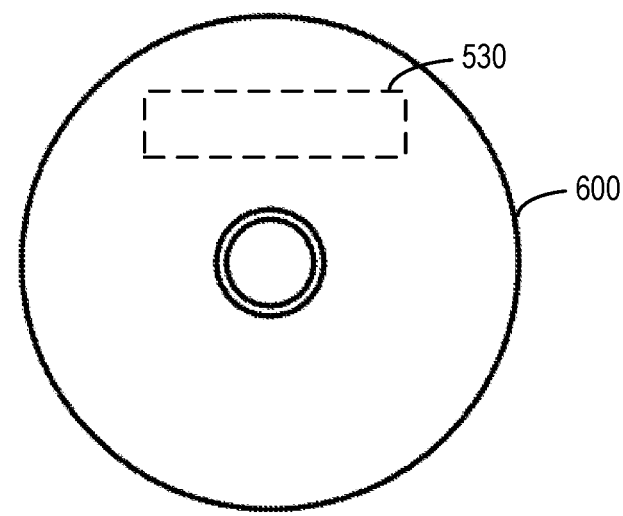
FIG. 6 illustrates a block diagram of an example computer readable medium in accordance with some example embodiments of the present disclosure.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operatively coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 500 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 500 may be instead comprised in the distributed unit, and at least some of the described processes may be performed by the distributed unit.

In an embodiment, the execution of at least some of the functionalities of the device 500 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 500 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 as described above with reference to FIG. 3 and/or the method 400 as described above with reference to FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory including computer program code;
   the at least one memory and the computer program codes are configured to, with the at least one processor, cause the first device to:
   receive, from a second device, a configuration for channel state information reporting, the configuration comprising at least a block error rate target and an indication of a number of HARQ transmissions;
   determine Channel Quality Indicator based on the block error rate target and the number of HARQ transmissions indicated by the configuration; and
   transmit a channel state information report comprising the Channel Quality Indicator to the second device.

2. The first device of claim 1, wherein the at least one memory and the computer program codes are configured to, with the at least one processor, cause the first device to:
   receive the configuration from the second device via Radio Resource Control signaling.

3. The first device of claim 1, wherein the at least one memory and the computer program codes are configured to, with the at least one processor, cause the first device to:
   in accordance with a determination that the number of HARQ transmissions indicated by the configuration equals to a predetermined threshold,
      determine the Channel Quality Indicator based on the block error rate target after reception of an initial HARQ transmission for a transport block.

4. The first device of claim 3, wherein the at least one memory and the computer program codes are configured to, with the at least one processor, cause the first device to:
   in accordance with a determination that the number of HARQ transmissions indicated by the configuration exceeds the predetermined threshold,
      determine the Channel Quality Indicator based on the block error rate target after reception of the number of HARQ transmissions for a transport block.

5. The first device of claim 3, wherein the at least one memory and the computer program codes are configured to, with the at least one processor, cause the first device to:
   in accordance with a determination that the number of HARQ transmissions indicated by the configuration exceeds the predetermined threshold,
      determine the Channel Quality Indicator based on the block error rate target after reception of a part of the number of HARQ transmissions for a transport block.

6. The first device of claim 3, wherein the predetermined threshold equals to 1.

7. The first device of claim 1, wherein the at least one memory and the computer program codes are configured to, with the at least one processor, cause the first device to:
   in response to receiving a request for the channel state information report from the second device, transmit the channel state information report to the second device.

8. The first device of claim 1, wherein the channel state information report further comprises Rank Indicator.

9. The first device of claim 1, wherein the channel state information report further comprises an identifier of a service associated with the channel state information report.

10. The first device of claim 9, wherein the configuration further comprises the identifier of the service associated with the channel state information report.

11. The first device of claim 9, wherein the identifier of the service associated with the channel state information report is determined based on Group-Radio Network Temporary Identifier associated with the service.

12. The first device of claim 1, wherein the first device is a terminal device and the second device is a network device serving the terminal device.

13. A second device comprising:
at least one processor; and
at least one memory including computer program code;
the at least one memory and the computer program codes are configured to, with the at least one processor, cause the second device to:
transmit, to a first device, a configuration for channel state information reporting, the configuration comprising at least a block error rate target and an indication of a number of HARQ transmissions; and
receive a channel state information report comprising Channel Quality Indicator from the first device, the Channel Quality Indicator being determined based on the block error rate target and the number of HARQ transmissions indicated by the configuration.

14. The second device of claim 13, wherein the at least one memory and the computer program codes are configured to, with the at least one processor, cause the second device to:
transmit the configuration to the first device via Radio Resource Control signaling.

15. The second device of claim 13, wherein the at least one memory and the computer program codes are configured to, with the at least one processor, cause the second device to:
transmit a request for the channel state information report to the first device.

16. The second device of claim 13, wherein the channel state information report further comprises Rank Indicator.

17. The second device of claim 13, wherein the channel state information report further comprises an identifier of a service associated with the channel state information report.

18. The second device of claim 17, wherein the configuration further comprises the identifier of the service associated with the channel state information report.

19. The second device of claim 17, wherein the identifier of the service associated with the channel state information report is determined based on Group-Radio Network Temporary Identifier associated with the service.

20. A method comprising:
receiving, at a first device and from a second device, a configuration for channel state information reporting, the configuration comprising at least a block error rate target and an indication of a number of HARQ transmissions;
determining Channel Quality Indicator based on the block error rate target and the number of HARQ transmissions indicated by the configuration; and
transmitting a channel state information report comprising the Channel Quality Indicator to the second device.

* * * * *